(12) United States Patent
Cao et al.

(10) Patent No.: US 6,647,005 B1
(45) Date of Patent: Nov. 11, 2003

(54) TRANSMISSION POWER CONTROL FOR PACKET SWITCHED COMMUNICATIONS SYSTEMS

(75) Inventors: Qiang Cao, Abbey Meads (GB); Jie Lin, Swindon (GB); Pantelis Monogioudis, Piscataway, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/359,264

(22) Filed: Jul. 22, 1999

(30) Foreign Application Priority Data

Jul. 28, 1998 (EP) .............................. 98306013

(51) Int. Cl.$^7$ .............................................. H04B 7/216
(52) U.S. Cl. ....................... 370/342; 370/318; 370/311; 370/313; 370/335; 455/522; 455/69
(58) Field of Search ................... 455/522, 69; 370/342, 370/318, 311, 313, 335

(56) References Cited

U.S. PATENT DOCUMENTS

| 5,056,109 A | * | 10/1991 | Gilhousen ................... 370/342 |
| 5,404,355 A | | 4/1995 | Raith ........................ 370/95.1 |
| 5,668,803 A | * | 9/1997 | Tymes ........................ 370/312 |
| 5,822,318 A | * | 10/1998 | Tiedemann ................. 370/391 |
| 5,884,187 A | * | 3/1999 | Ziv ............................. 455/522 |
| 6,038,223 A | * | 3/2000 | Hansson et al. ............ 370/328 |
| 6,167,270 A | * | 12/2000 | Rezaiifar ................... 455/442 |
| 6,181,683 B1 | * | 1/2001 | Chevillat et al. ........... 370/329 |
| 6,208,873 B1 | * | 3/2001 | Black et al. ................ 455/126 |
| 6,216,004 B1 | * | 4/2001 | Tiedemann ................. 455/442 |
| 6,233,439 B1 | * | 5/2001 | Jalali ......................... 455/127 |
| 6,240,071 B1 | * | 5/2001 | Willenegger et al. ....... 370/311 |
| 6,252,865 B1 | * | 6/2001 | Walton et al. .............. 370/335 |
| 6,259,927 B1 | * | 7/2001 | Butovitsch et al. ......... 455/442 |
| 6,275,478 B1 | * | 8/2001 | Tiedemann, Jr. ........... 370/318 |
| 6,285,886 B1 | * | 9/2001 | Kamel ........................ 455/522 |
| 6,307,849 B1 | * | 10/2001 | Tiedemann ................. 370/335 |
| 6,330,462 B1 | * | 12/2001 | Chen .......................... 455/572 |
| 6,341,124 B1 | * | 1/2002 | Johansson ................... 370/335 |
| 2001/0012276 A1 | * | 8/2001 | Tsunehara ................... 370/318 |
| 2001/0024431 A1 | * | 9/2001 | Koo ............................ 370/335 |
| 2002/0019245 A1 | * | 2/2002 | Longoni ..................... 455/522 |

FOREIGN PATENT DOCUMENTS

| EP | 0 847 147 A2 | 6/1998 | .......... H04B/7/005 |
| WO | WO 94/06217 | 3/1994 | .......... H04B/7/005 |
| WO | WO 95/31879 | 11/1995 | ............ H04Q/7/22 |

OTHER PUBLICATIONS

European Search Report, dated Feb. 2, 1999.

* cited by examiner

Primary Examiner—William Trost
Assistant Examiner—Marcos Torres

(57) ABSTRACT

A packet switched communications system is provided in which a station communicates with at least one user over downlink communication channel, the downlink communication channel being divided into a plurality of frames and each frame including a plurality of data packets. Each data packet is directed to a predetermined user and includes transmission power control information for said user. An extended transmission power control information field is provided in at least one data packet in every frame, which includes transmission power control information for 10 at least one other user of the communication system.

5 Claims, 8 Drawing Sheets

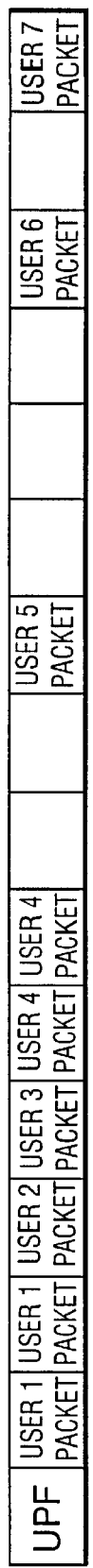
FIG. 2
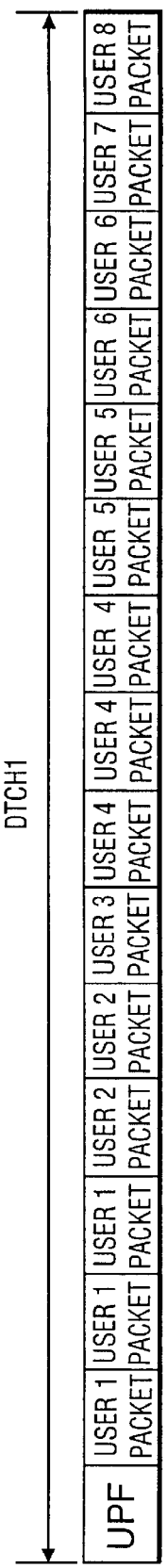
FIG. 3
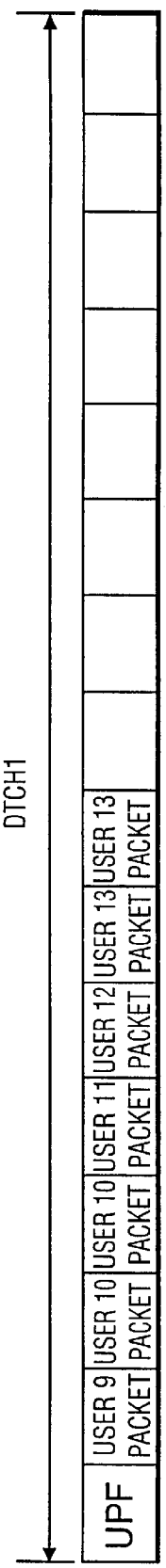

FIG. 5

| UPF0 | UPF1 | UPF2 | UPF3 | UPF4 | UPF5 | UPF6 | UPF7 | UPF8 | UPF9 | UPF10 | UPF11 | UPF12 | UPF13 | UPF14 | UPF15 |
|---|---|---|---|---|---|---|---|---|---|---|---|---|---|---|---|
| 0 | 1 | 1 | 0 | 1 | 0 | 1 | 0 | 1 | 0 | 0 | 1 | 0 | 0 | 0 | 1 |

UPF

FIG. 6

| UPF0 | UPF1 | UPF2 | UPF3 | UPF4 | UPF5 | UPF6 | UPF7 | UPF8 | UPF9 | UPF10 | UPF11 | UPF12 | UPF13 | UPF14 | UPF15 |
|---|---|---|---|---|---|---|---|---|---|---|---|---|---|---|---|
| 00 | 11 | 11 | 00 | 11 | 00 | 11 | 00 | 11 | 00 | 00 | 11 | 00 | 00 | 00 | 11 |

UPF

TRANSMISSION POWER CONTROL FOR PACKET SWITCHED COMMUNICATIONS SYSTEMS

CROSS-REFERENCE TO RELATED APPLICATION

This application claims priority of European Patent Application No. 98306013.8, which was filed on Jul. 28, 1998.

This invention relates to communication systems and more particularly to a method and system for the fast closed loop power control in Wideband Code Division Multiple Access (W-CDMA) communications.

Traditionally, user traffic in a CDMA system is circuit switched and, 5 once a call has been set up, the connection is maintained throughout the duration of the service request. A Dedicated Traffic Channel (DTCH) is assigned to each active user for both the uplink and the downlink and each DTCH is characterized by a unique spreading code. Throughout the entire session, the DTCH is used exclusively by the active user.

The circuit switched method is robust and results in high system capacity by supporting macro-diversity (soft handover) power control. In wideband multiservice CDMA systems, extremely bursty traffic needs to be supported by adjusting the data rate, and hence the spreading factor and spreading code. However, the need to quickly adjust the spreading code leads to highly complex code allocation algorithms.

Another popular method for accommodating bursty services is through packet switched data. ETSI UMTS W-CDMA and ARIB W-CDMA propose to use the Random Access Channel (RACH) and the Forward Access Channel (FACH) to transmit infrequent bursty packet data. The advantage of such a scheme is a quick set up time, since dedicated channel is not required. However, this transmission mechanism uses open loop power control only, and macro-diversity is not supported.

In patent application Ser. No. EP 98303327.5 "Time Division Multiple Access Communication System", multiplexing many bursty packet data users onto the same downlink DTCH was described. The multiplexing scheme combined many of the benefits of the above mentioned schemes, namely low complexity code allocation, macro-diversity and soft handover and low associated control overhead. In addition, the scheme provides limited closed loop power control. The extent to which the fast closed loop power control can be achieved depends upon radio frame configuration since the more slots allocated to a user in a radio frame, the better the closed power control. However, in the worst case, where only one slot is allocated to a user in one frame, closed loop power is slowed down and thus there is a significant performance hit.

There is thus a requirement for a fast closed loop power control to maintain packet data transmission performance.

SUMMARY OF THE INVENTION

According to a first aspect of the invention there is provided a packet switched communications system comprising a downlink communication channel over which a to station communicates with at least one user, said downlink communication channel being divided into a plurality of frames, each frame including a plurality of data packets, each data packet being directed to a predetermined user and including transmission power control information for said user, and characterized in that at least one data packet in every frame includes transmission power control information for at least one other user of the communication system.

The system may include a null user packet, not directed to any predetermined that includes transmission power control information for at least one user of the communication system. At least one packet (either data or null user) in every frame includes transmission power control information for at least one other user of the communication system.

According to a second aspect of the invention there is provided a method of packet switched communication between a station and at least one user comprising providing a downlink communication channel over which said station communicates with said at least one user, dividing said downlink communication channel into a plurality of frames, each frame including a plurality of data packets, directing each data packet to a predetermined user, including in each data packet transmission power control information for said user, and characterized in that at least one data packet in every frame includes transmission power control information for at least one other user of the communication system.

The system uses an Extended Transmission Power Control (ETPC) field, which contains packet transmission power control information for the other users of the packet switched communications system. This allows for very fast closed loop power control, since the power control information is updated once every frame, even once every packet, for packet transmission over shared single physical dedicated traffic channel. There is thus a significant capacity improvement.

Thus, a scheme to multiplex many bursty packet data users onto a single physical Dedicated Traffic Channel (DTCH) is provided. This scheme has advantages over both random access packet and single user per code virtual circuit transmission schemes for bursty packet data. The invention simplifies orthogonal spreading code allocation while maintaining most of the benefits of virtual circuit transmission (e.g., soft handover, diversity gain, and closed loop power control).

BRIEF DESCRIPTION OF THE DRAWINGS

An embodiment of the invention is described, by way of example, with reference to the following figures, in which:

FIG. 2 illustrates another prior art downlink DTCH channel structure;

FIG. 3 illustrates a prior art downlink DTCH channel serial transmission;

FIG. 5 illustrates a prior art UPF structure;

FIG. 6 illustrates a prior art UPF pattern repetition;

DETAILED DESCRIPTION

In the initialization stage, a mobile station (MS) acquires slot and frame synchronization and also needs to perform code-group identification and scrambling code identification. After the scrambling code has been identified, the primary Common Control Physical Channel (CCPCH) can be detected, the system and cell specific BCCH information can be read. The Random Access Channel (RACH) will be known to the MS.

For an MS initiated bursty packet data transmission, the MS performs a random access request procedure. Based on the successful reception of the random access request from an MS, the Base Station (BS) informs the MS about DTCH on which the packet data is to be transmitted. For BS initiated bursty packet data transmission, the BS simply pages the user(s) and indicates the DTCH on which the packet data is to be transmitted and the MS acknowledges the DTCH set up. In both cases, MSs are informed by the BS about the number of the slot in the DTCH frame assigned to them. In other words, each MS knows the location of the slot (if any) in the DTCH frame to receive packets.

Figure 1:
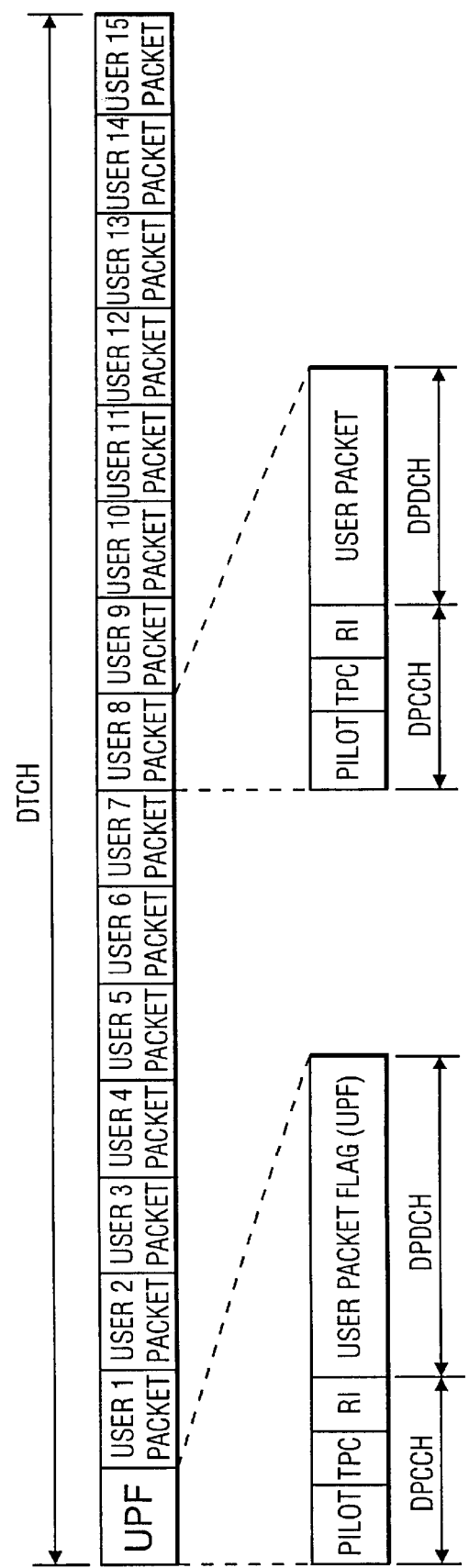
FIG. 1 illustrates a prior art downlink DTCH channel structure.

The Downlink DTCH channel is organized as shown in FIG. 1. A DTCH frame consists of 16 slots. The first slot is used to transmit a User Packet Flag (UPF) indicating the location of a packet that is addressed to a specific user. The rest of the slots in the frame will be used to transmit user packets.

Control information (pilot, transmission power control (TPC), and rate information (RI) is transmitted on a dedicated physical control channel (DPCCH) and data information is transmitted on dedicated physical data channel (DPDCH). The DPCCH and DPDCH are multiplexed in time, as shown in FIG. 1. While the DPDCH assigned to each user carries the user packet, the DPDCH of the UPF carries the user packet flag (UPF) information instead.

A common configuration of the DTCH is such that not all frame slots are filled up by user packets, as shown in FIG. 2. In cases where one DTCH frame cannot accommodate all active packets from each user, more than one DTCH frame is used. This case is shown in FIG. 3. Note that in this case only one DTCH channel (multiple frames, but only one code channel) is used. This scheme is used when the delay is allowable according to quality of service (QoS) requirement.

Figure 4:
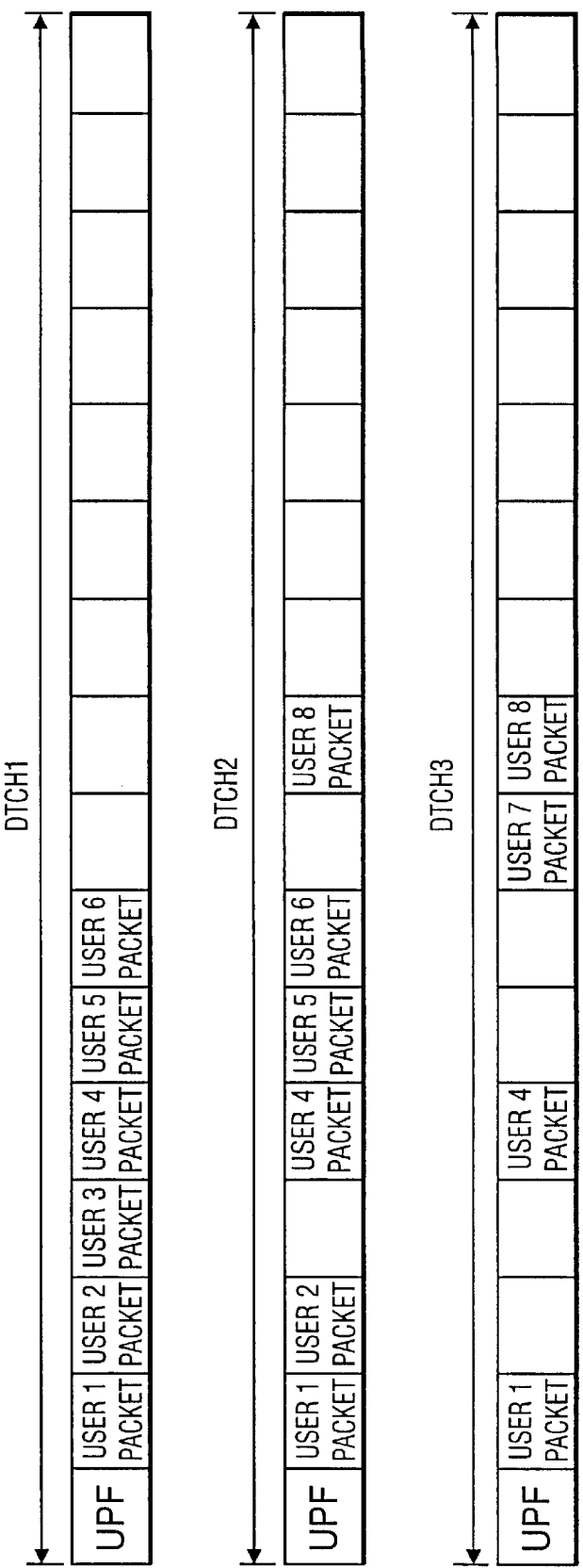
FIG. 4 illustrates a prior art downlink DTCH channel parallel transmission.

To achieve higher bit rate transmission, a multicode scheme is used to set up multiple DTCHs, shown in FIG. 4.

A User Packet Flag (UPF) is composed of 15 fields, corresponding to at most 15 slots for user packets in a frame

UPF=[UPF1, UPF2, UPF3, . . . , UPF15]

Each field of a UPF indicates slot status (whether there is a packet for the specific user or not):

UPFi=[status]

where $$status = \begin{cases} 0 & \text{no packet} \\ 1 & \text{a packet} \end{cases}$$

A UPF is merely a sequence of bits of length L and, typically, L is equal to 15+1 (including first bit=0 permanently), since at most 15 users are assigned to receive bursty packet data from the DTCH. As soon as an MS receives a UPF, it will be able to identify if there is a packet contained in the frame. If there is, it can perform reception. An example of UPF is shown in FIG. 5.

This UPF pattern (UPF=6 A91 H) indicates that the following users have packets in the frame:

User 1, User 2, User 4, User 6, User 8, User 11, and User 15.

The following users do not have packets in the frame: User 3, User 5, User 7, User 9, User 10, User 12, User 13, and User 14.

Note that UPF0 is always set as 0. To make it more robust, repetition or simple encoding can be used to obtain diversity gain as shown in FIG. 6.

Control information (Pilot, TPC, and RI) is transmitted in every slot on DTCH, even in a blank slot (no data packet filled in that slot). Therefore, soft handover mechanism, as well as limited closed loop power control, may still be retained.

Figure 7:
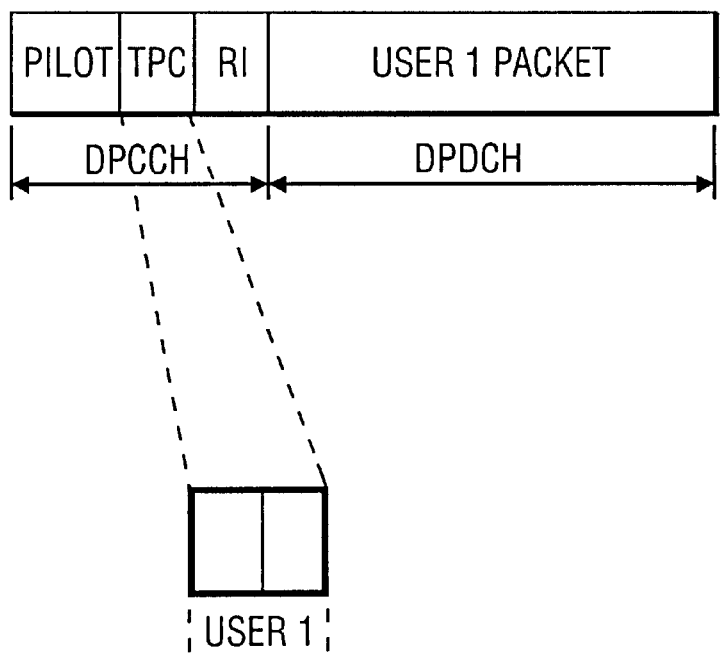
FIG. 7 illustrates a prior art transmission power control symbol.

The uplink transmission is not time multiplexed; each user is assigned a unique spreading code, thus code multiplexed. Since the control channel is transmitted continuously for each user in the uplink, the base station is able to monitor the received power continuously. However, the BTS is limited in the number of power control symbols it is able to send each user. In fact, the BTS only transmits a TPC symbol relevant to an individual user, during the slot assigned to that user (e.g., User 1, shown in FIG. 7). Consequently, the user may receive as few as one TPC symbol per frame in the worst case, where only one slot in a frame is allocated to a user. The uplink power control is limited, not only in the quality of the information, but also in how often the information can be transmitted.

Although this scheme has advantages over both transmission on Random Access Channel (RACH) and single user per code schemes for bursty packet data, the power control being may slowed down, when the power control information is only updated once every frame.

By extending the TPC field to contain the power control information for all users in a physical channel, all MS users are able to receive TPC information in every slot, even when they are idle on the down link transmission. MS users can then quickly adjust their uplink transmission power in response to changes in the power allocation.

Figure 8:
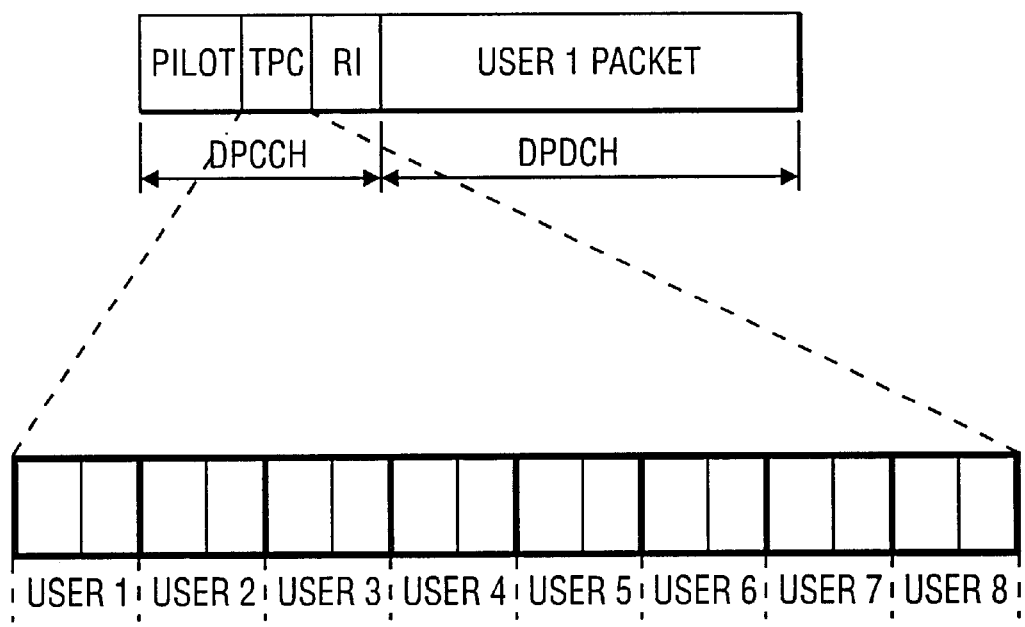
FIG. 8 illustrates a transmission power control mechanism according to the invention.

Consider, for example, an application of down-loading a picture from Internet with peak packet data transmission rate of 128 kbps. In one radio frame, there are about 60 bits payload plus 8 pilot bits, and 2 TPC bits (one symbol) within a slot of 0.625 ms. It is feasible to extend the TPC field symbol number from one to the number of users over the physical channel, shown in FIG. 8.

Note that 8 users per radio frame were used as an example. Obviously, the fewer users per frame, the less the overhead and the more efficient the data transmission. On the other hand, the less users per frame, the less efficient the code utilization. Therefore, there is a clear trade off between the number of users multiplexed onto a frame and code utilization efficiency. When overhead of TPC symbol is too large (e.g., too many users on one code channel), one may consider deploying another code channel.

Figure 9:
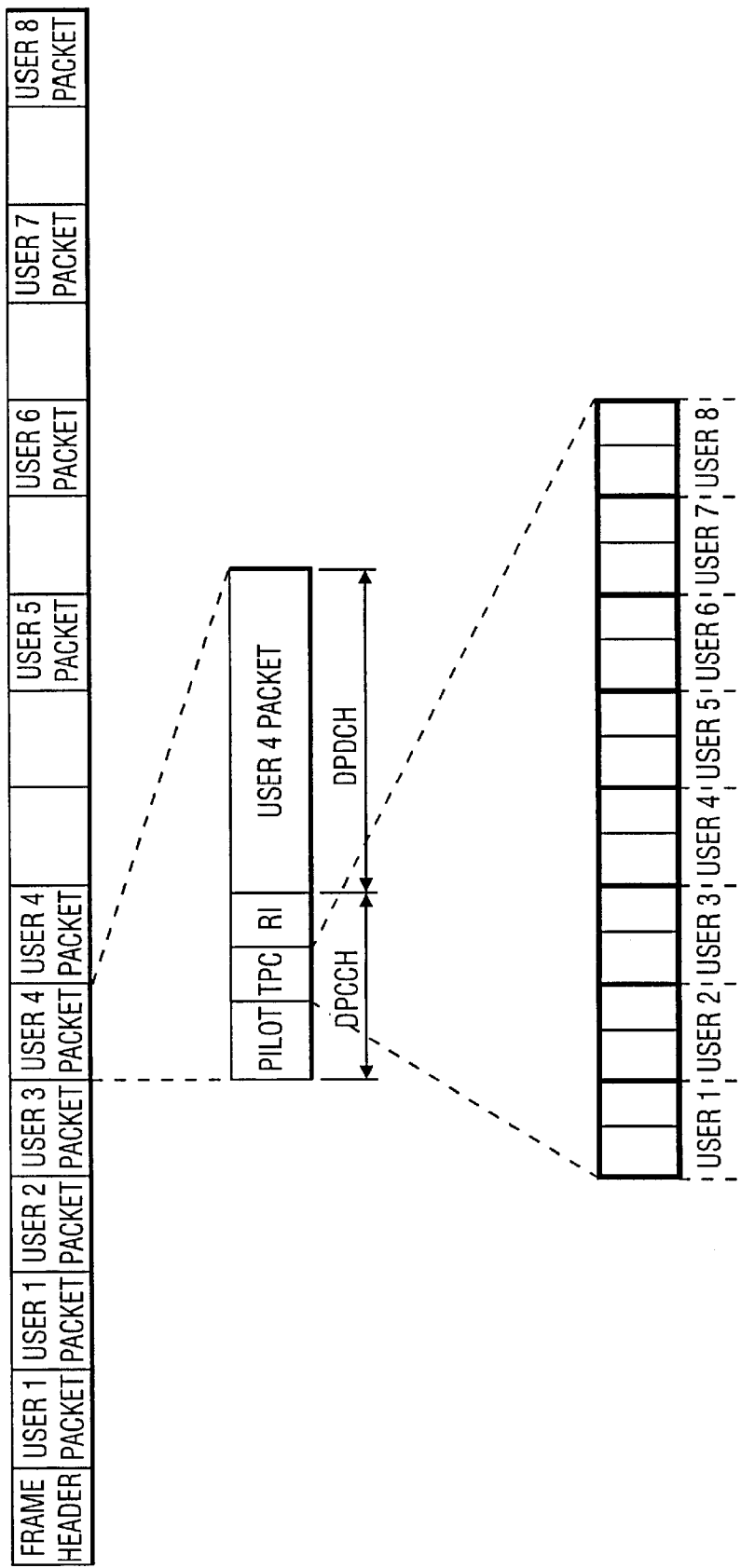
FIG. 9 illustrates another transmission power control mechanism according to the invention.
Figure 10:
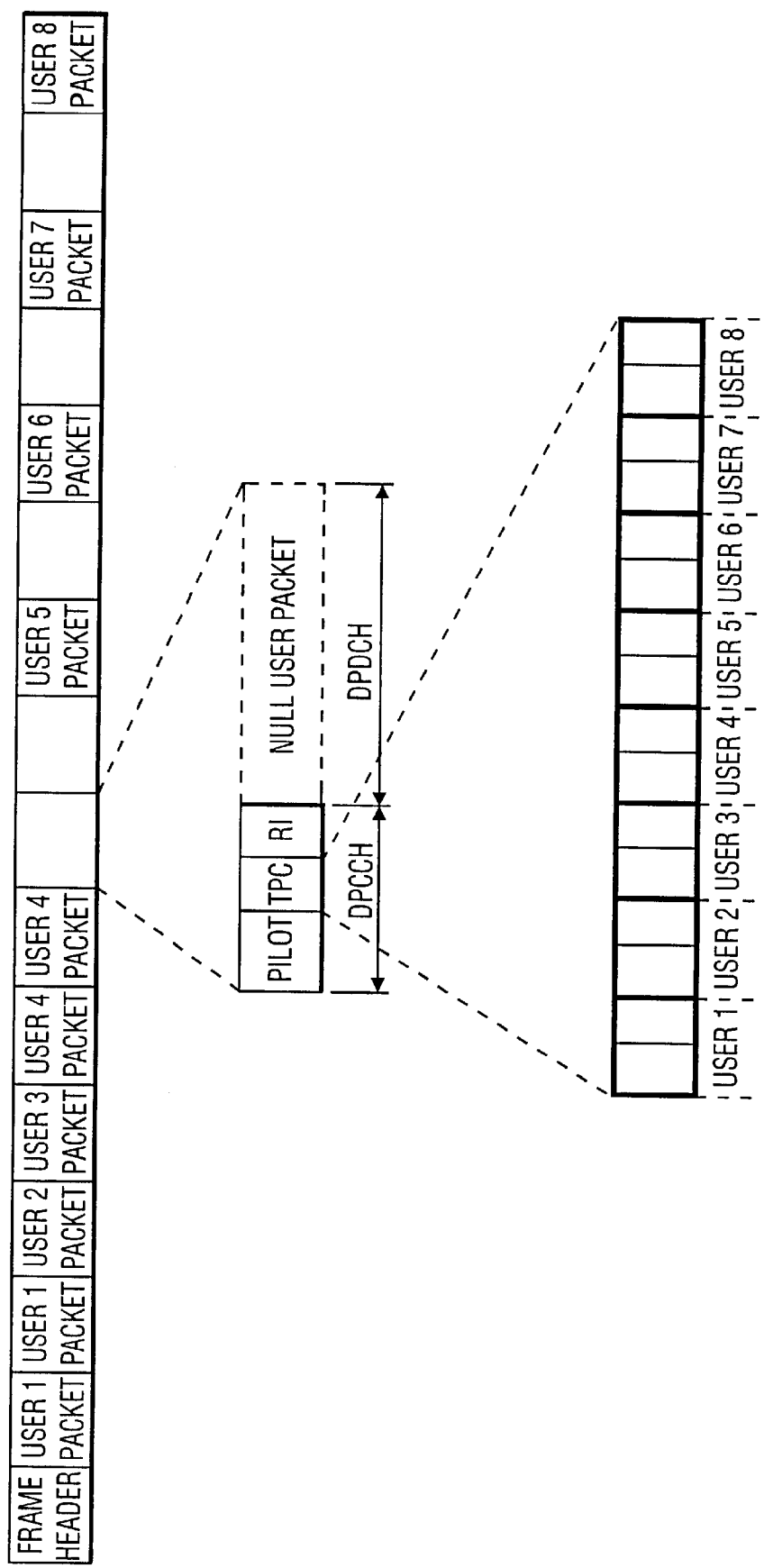
FIG. 10 illustrates another transmission power control mechanism according to the invention.

With the power control mechanism, radio frame configuration may be shown as FIG. 9 and FIG. 10 (still using 8 users for example). in FIG. 9, user 4 packet includes an extended TPC field that contains power control information for all users on uplink transmission. In addition to User 4, each user listens to this field and picks up his own TPC symbol. Even in an idle slot where no user packet is transmitted, the extended TPC field used in conjunction with pilot signal is still transmitted. Each user picks up its own TPC information even when the User Packet field is null. This is shown in FIG. 10.

Figure 11:
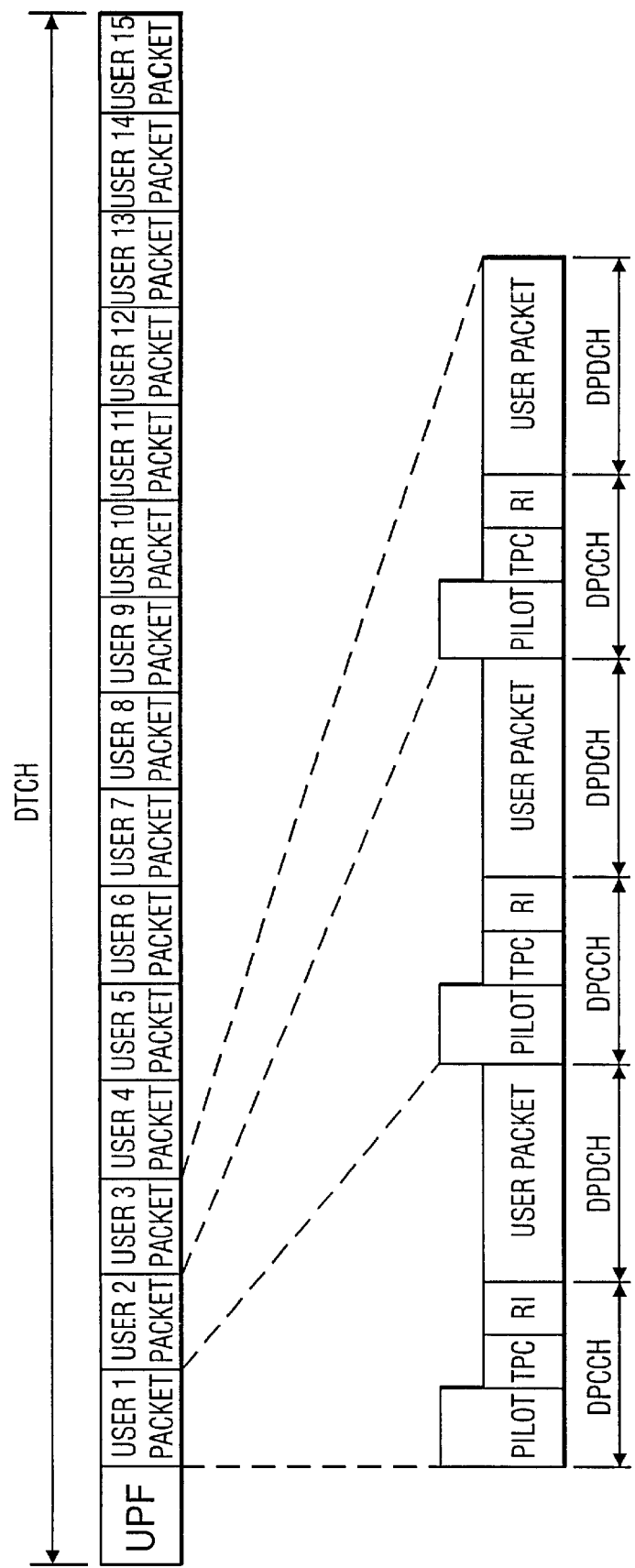
FIG. 11 illustrates yet another transmission power control mechanism according to the invention.

Since there is no code shortage problem on the up link transmission, it can be assumed that each packet data user can hold one DTCH. In each time slot, the user packet data is destined to a particular user only. However, all users use the pilot symbols. Therefore, the downlink transmit power of the pilot symbols must be constant and high enough for all users to properly receive. The data portion may be adjusted for each user. Each user's continuous uplink control channel contains all downlink power control symbols defined for a Dedicated Traffic Channel. Hence the downlink can adjust the power level of user data properly, as shown in FIG. 11.

What is claimed is:

1. A packet switched communications system comprising
   a downlink communication channel over which a station communicates with at least one user,
   said downlink communication channel being divided into a plurality of frames, each frame including a plurality of data packets,
   each data packet being directed to a predetermined user and including transmission power control information for said user, and
   at least one data packet in every frame includes transmission power control information for at least one other user of the communication system.

2. A packet switched communications system as claimed in claim 1 wherein said frame includes a null user packet, not directed to any predetermined user and wherein said null user packet includes transmission power control information for at least one user of the communication system.

3. A packet switched communications system as claimed in claim 1 wherein at least one packet (data or null user) in every frame includes transmission power control information for at least one other user of the communication system.

4. A method of packet switched communication between a station and at least one user comprising
   providing a downlink communication channel over which said station communicates with said at least one user,
   dividing said downlink communication channel into a plurality of frames, each frame including a plurality of data packets,
   directing each data packet to a predetermined user
   including in each data packet transmission power control information for said user, and
   at least one data packet in every frame includes transmission power control information for at least one other user of the communication system.

5. A packet switched communication system comprising
   a downlink communication channel over which a station communicates with each of a plurality of users,
   said downlink communication channel being divided into a plurality of frames, each frame including a plurality of data packets,
   each data packet being directed to a predetermined one of the users and including transmission power control information for said user, and
   each of the data packets in every frame includes transmission power control information for the other users.

* * * * *